United States Patent [19]
Atherton et al.

[11] Patent Number: 6,081,802
[45] Date of Patent: Jun. 27, 2000

[54] SYSTEM AND METHOD FOR ACCESSING COMPACTLY STORED MAP ELEMENT INFORMATION FROM MEMORY

[75] Inventors: Mark Blelock Atherton, Issaquah; Paul Sean Harrington, Seattle, both of Wash.

[73] Assignee: Microsoft Corporation, Redmond, Wash.

[21] Appl. No.: 08/909,805

[22] Filed: Aug. 12, 1997

[51] Int. Cl.[7] .................................................. G06F 17/00
[52] U.S. Cl. ................... 707/3; 707/200; 707/4; 707/5
[58] Field of Search ............... 707/1–206; 711/146; 345/432; 375/341; 348/146

[56] References Cited

U.S. PATENT DOCUMENTS

| | | | |
|---|---|---|---|
| 5,857,196 | 1/1999 | Angle et al. | 707/102 |
| 5,873,078 | 2/1999 | Angle et al. | 707/3 |
| 5,933,195 | 8/1999 | Florencio | 348/146 |
| 5,933,462 | 8/1999 | Viterbe et al. | 375/341 |
| 5,940,080 | 8/1999 | Ruechle et al. | 345/432 |
| 5,943,686 | 8/1999 | Arimilli et al. | 711/146 |

*Primary Examiner*—Thomas G. Black
*Assistant Examiner*—David Y. Jung
*Attorney, Agent, or Firm*—Jones & Askew, LLP

[57] ABSTRACT

Accessing compactly stored map element information from memory using a received encoded identification reference which identifies a map element, such as a link or a node. A link represents a thoroughfare on a map and a node represents an end point of a thoroughfare on the map. A block number is determined and an offset value is determined from the map element's identification reference. The block number provides a memory address for the beginning of a block of memory representing a region of the map. The offset value is a memory offset relative to the block's memory address. If the block referenced by the block number has not yet been loaded, the block having information about the map element is loaded. Once loaded, the information about each link type of map element in the region is read. The link information is stored within a designated part of a block data structure. Additionally, the link information is used to reconstruct information about the map region's node type of map elements. Once reconstructed, the node information is stored within another part of the block data structure. The block data structure remains in a memory cache so that information about the map element can be quickly accessed while information about the map element remains compactly stored in the block of memory.

20 Claims, 6 Drawing Sheets

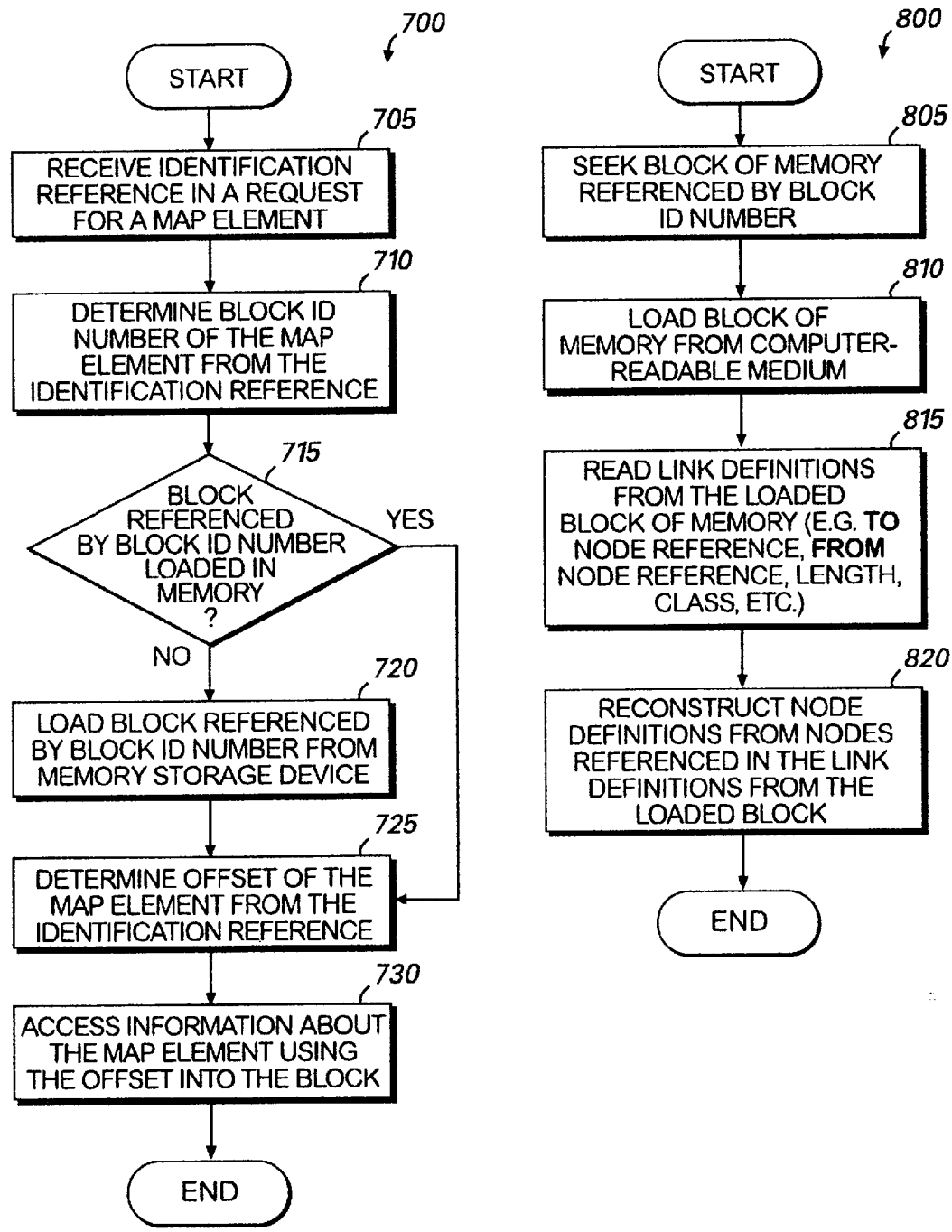

SYSTEM AND METHOD FOR ACCESSING COMPACTLY STORED MAP ELEMENT INFORMATION FROM MEMORY

RELATED APPLICATIONS

The present patent application is related to U.S. patent application Ser. No. 08/910,952 filed on Aug. 8, 1997 entitled "System and Method for Calculating a Route Between Two Points," which is pending within the U.S. Patent and Trademark Office and has a common assignee and common inventor with the present patent application.

TECHNICAL FIELD

This invention generally relates to accessing map information from memory and, more particularly described, relates to accessing information about link elements and node elements from a block of memory by using an identification reference while the information is stored in a compact format.

BACKGROUND OF THE INVENTION

A conventional paper road map can be helpful when planning a route for a trip. However, a paper road map is limited in how much detail and information is available to the user. A computerized road-mapping program overcomes this problem with its ability to store large amounts of map information in memory. In this manner, a user is able to interact with the computerized road-mapping program to see a richly detailed map.

With the advent of large capacity memory storage devices, such as CD-ROMs, some computerized road-mapping programs are capable of representing very large and extremely detailed road maps. For example, a map of the entire United States having street-level information typically requires millions of map elements. These map elements represent transportation thoroughfares or roads and the end points of such thoroughfares. In some computerized road-mapping programs, a link is a type of map element representing a thoroughfare on the map. A node is a type of map element representing one of the end points of a link. The map elements may also contain other related information or attributes, such as whether a thoroughfare is a toll road or is characterized as a scenic thoroughfare. This additional information is helpful when attempting to plan a trip using a computerized road-mapping program. For example, the computerized road-mapping program can determine a particular route for a user based on the user's preferences for scenic thoroughfares instead of interstate highways.

As an increasing quantity (amount) of map information is stored, most computerized road-mapping programs begin to take longer to access the map information describing each map element. It is simply an issue of looking for a needle in a larger haystack. In other words, feature rich and large maps can become painfully slow to use. This is undesirable because the user may quickly become frustrated and dissatisfied when using such a slow computerized road-mapping program. Thus, there is a need to compactly store map elements to allow a large amount of information to be stored while still maintaining the ability to quickly access a map element when calculating a route across the map.

One possible solution is merely to increase the amount of storage space on the memory storage device. This possible approach may alleviate the need to compactly store the map elements. However, this approach does not address the increased access time typically experienced when storing data on larger memory storage devices. Finding the data takes longer because there is more memory to search when seeking to access a specific map element in the stored data. Furthermore, computer resources, such as memory space, can be limited. CD-ROMs are large, but they are still finite in memory storage capacity. Therefore, merely increasing the amount of memory used when storing the map elements representing the map does not solve the problem.

A solution for quickly accessing map elements is used in previous versions of a computerized road-mapping program called "AUTOMAP TRIP PLANNER", developed and distributed by Microsoft Corporation of Redmond, Wash. This program divides up the map into geographic regions. A given region's map information is stored within a predetermined block of memory. The map information includes information describing different kinds of map elements, such as link elements and node elements.

The information describing these map elements (nodes & links) is usually sequentially stored in a memory block. An index describes which memory block contains which map element. Accessing a particular map element usually involves a binary search of the index to determine which block contains the map element and then a binary search of the determined block for the map element. This solution used in previous versions of the "AUTOMAP TRIP PLANNER" program is adequate when a map has a relatively small number of map elements, such as 40,000. However, as the number of map elements grows larger in terms of orders of magnitude, this type of index/searching-based solution for accessing a map element can become undesirably time consuming. Furthermore, this type of index/searching-based solution does not attempt to address the problem of maintaining a relatively small memory storage footprint when representing a large amount of information (e.g., a large number of map elements representing a very large and detailed map).

Thus, there is a need for a system for storing, referencing, and accessing information about a map, which (1) reduces the amount of memory storage space required to represent the map, (2) maintains the ability to quickly access a map element, (3) does not require binary searching to find a map element in memory, and (4) does not require the map elements to be sequentially stored and referenced. In summary, such a system allows very rapid, non-sequential access to the map elements when a computerized road-mapping program is calculating a route across the map.

SUMMARY OF THE PRESENT INVENTION

The present invention satisfies the above-described needs by providing a system and method for accessing information about a map element from a block of memory representing a region of a map. Typically, the information has been loaded from a storage device, such as a CD or hard disk, and stored in a block data structure for easy access. Furthermore, the element is usually either a node type of element or a link type of element. A link element typically represents a thoroughfare on the map while a node element typically represents one of the end points of a thoroughfare on the map. A thoroughfare is a general term meaning a segment of a route across the map. For example, a thoroughfare may include a walking path, a country road, an interstate highway, a railroad track, a travel lane for ocean vessels, or a designated airspace route for airliners.

In general, the present invention provides a method for accessing information about an element from the block of memory. First, an identification reference for the element is received. Typically, the identification reference includes a block number and an offset value. The block number provides a memory storage location of the block of memory. The offset value provides a memory location within the block of memory associated with the element.

After determining the block number and the offset value from the identification reference, the information about the element is accessed at the memory location designated by the offset within the appropriate block of memory. Using the block number and offset value of the identification reference is advantageous when attempting to access information about the element because it does not require binary searching to find the element in memory. Additionally, using such an identification reference for the element does not require the element to be sequentially stored and referenced.

However, if the block of memory has not yet been loaded, the block of memory is typically loaded. Thereafter, information about a node type of element may be reconstructed from data within the block. The data typically defines other elements, such as the link elements, within the block.

More particularly stated, information about the block's link elements is read after loading the block. This information about the block's link elements includes a TO reference and a FROM reference for each of the block's link elements. The TO reference is associated with one of the block's node elements. For a given link element, the TO reference typically defines the link's destination node using its full identification reference. Likewise, the FROM reference is associated with another of the block's node elements, typically defining the link's origination node using its partial identification reference. By using the partial identification reference (e.g., the offset value) instead of the full identification reference, additionally memory storage space is advantageously saved.

Additionally, once the information about each of the block's link elements is read, the link information is usually stored in a first part of a block data structure. The block data structure is created in a memory cache so to provide quick access to an element's information.

The block's node elements are determined from the node elements referenced in the link information. Information about each of the block's node elements is then reconstructed from the block's link information. Reconstruction of the block's node element information may use information contained with the FROM references for each of the block's link elements. Reconstruction of the block's node element information may also use information contained with the TO references for each of the block's two-way link elements.

Each node may be referenced with a unique identification reference because it lies in exactly one block or region. Typically, each link has one identification reference. However, a link called a spanning link may have two identification references if it joins two nodes which lie in different blocks or regions. By carefully selecting the boundaries of the blocks or regions, the number of such spanning links may be minimized so that the overall memory storage size of the map elements representing the map is reduced.

Once reconstructed, the node information is then stored in a second part of the block data structure. Thus, information about an element can be reconstructed from a compact format and advantageously stored in a quickly accessible block data structure.

The present invention also provides a computer system for accessing information about map elements, such as link elements and node elements, related to a region of a map.

The computer system includes a processor and memory cache for maintaining a block data structure. The computer system also includes a storage device coupled to the processor. The memory storage device maintains a block of memory related to the map region.

Within the computer system, the processor typically determines the block of memory using an identification reference for one of the map elements. The identification reference may have a block number representing the memory storage location of the block within the storage device. The processor is able to load the block of memory having information about the map elements. The processor is then able to create the block data structure within the cache of memory and store information related to the block's link element in a first part of the block data structure. Furthermore, the processor can reconstruct information related to a node element and store the reconstructed information in a second part of the block data structure. Once the block data structure has been populated with information about the map elements, the processor is able to quickly access the information about the map elements within the block data structure while advantageously maintaining the block of memory in a compact storage format.

The present invention and its advantages, those described above and otherwise, will be appreciated from studying the following detailed description and drawings, and the appended claims.

BRIEF DESCRIPTION OF THE DRAWINGS

FIG. 7 is a flow diagram illustrating the preferred steps for accessing information about a map element in an exemplary embodiment of the present invention.

FIG. 8 is a flow diagram illustrating the preferred steps for loading a block of memory from memory storage and reconstructing information about node elements in an exemplary embodiment of the present invention.

DETAILED DESCRIPTION

Figure 1:
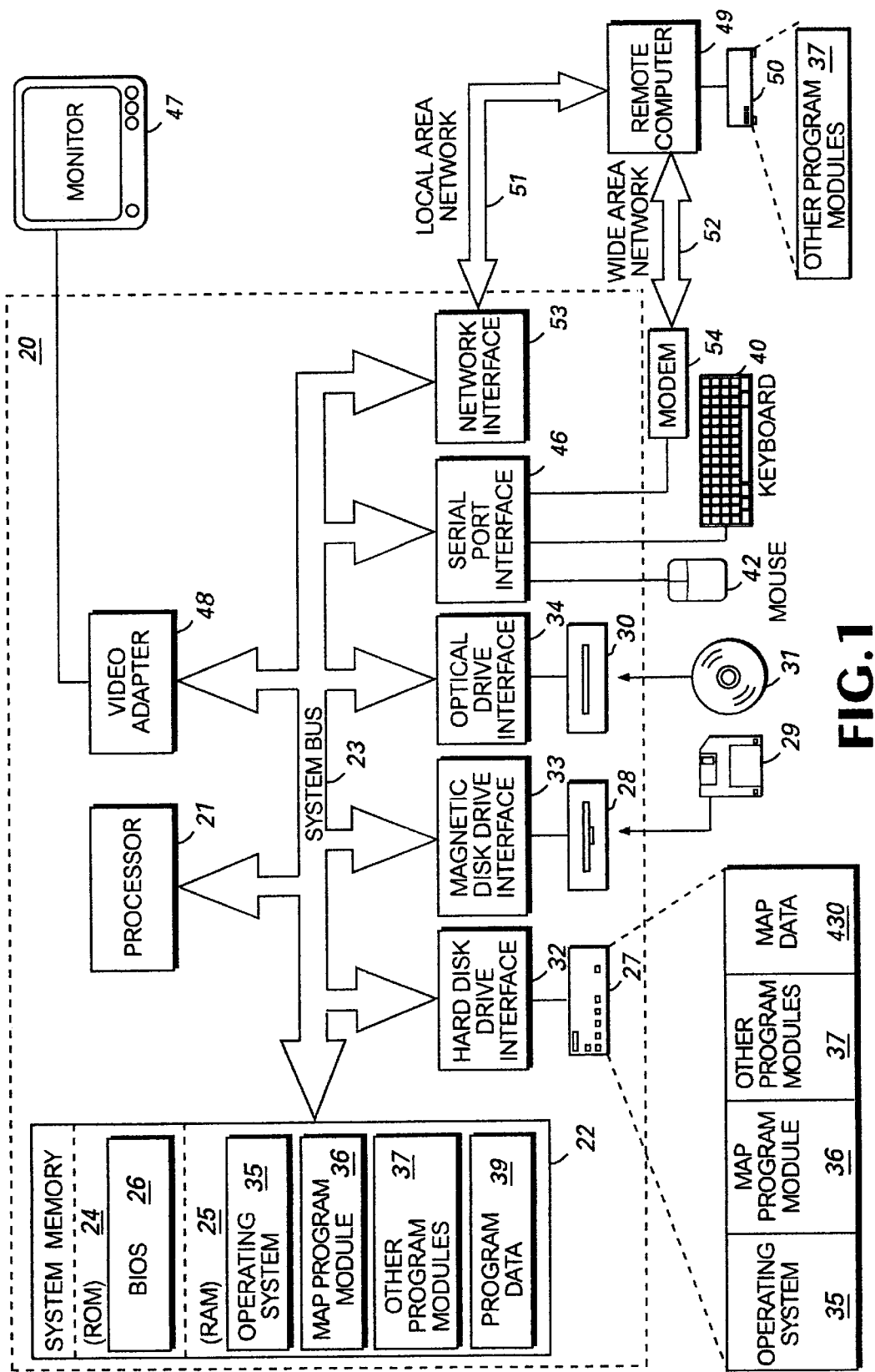
FIG. 1 is a block diagram of a personal computer that provides an exemplary operating environment for an embodiment of the present invention.

An embodiment of the present invention is described for accessing information about map elements using a special identification reference and while the information is stored in a compact format within a block of memory. Typically, a map is divided into geographic regions or blocks represented as a block of memory. Each region is sequentially assigned a block number and contains a variable amount of map elements, such as nodes and links. A link represents a thoroughfare on a map while a node represents one of the end points of a thoroughfare on the map. A thoroughfare is a general term meaning a segment of a route across the map. In the context of traveling, a thoroughfare may include a walking path, a country road, an interstate highway, a railroad track, a travel lane for ocean vessels, or a designated airspace route for airliners.

Within the block representing each region, the nodes and links are stored in different memory locations. Each node or link within a block is assigned a unique offset. This offset determines the node or link's memory location within the block. A reference to a node or link is implemented as an identification reference comprising a block number (16 bits) and an offset (8 bits). Those skilled in the art will realize that such a 16 bit/8 bit implementation is not necessary for an embodiment of the present invention. Other implementations of the identification reference may have different sized block numbers and offsets depending on the number of map elements or other hardware limitations.

However, those skilled in the art will also realize that under this type of encoding scheme, accessing information about a node or link is fast because the identification reference itself points to the block's memory location and the node/link within the block. No binary searching through stored information is required to quickly find the node or link information on a memory storage device, such as a CD.

Furthermore, the block used when accessing the desired map element's information is typically a block data structure. The block data structure is created from the compactly stored information, also called routing data, on a memory storage device. Essentially, information about the links in a region are stored and information about the nodes are reconstructed based upon the link information. This allows for a much smaller memory storage footprint for map information when compared to other conventional formats for storing map information.

The preferred embodiment of the present invention is represented by a map program module called "MICROSOFT EXPEDIA TRIP PLANNER 98" developed by Microsoft Corporation of Redmond, Wash. designed to work with Microsoft Corporation's "WINDOWS 95" and "WINDOWS NT 4.0" operating systems. Briefly described, the "MICROSOFT EXPEDIA TRIP PLANNER 98" program module is a program module used to view maps of cities and points of interest and plan trips via a route between map locations. The "MICROSOFT EXPEDIA TRIP PLANNER 98" program module references and accesses map information (i.e., information about map elements, such as nodes and links) when calculating such a route. The map information is stored on a physical memory storage device in a compact format. Under this compact storage format a great deal of memory space is saved while still providing rapid access to the map information. This aspect of accessing compactly stored information while maintaining rapid access to the information is the focus of the present invention.

Figure 2:
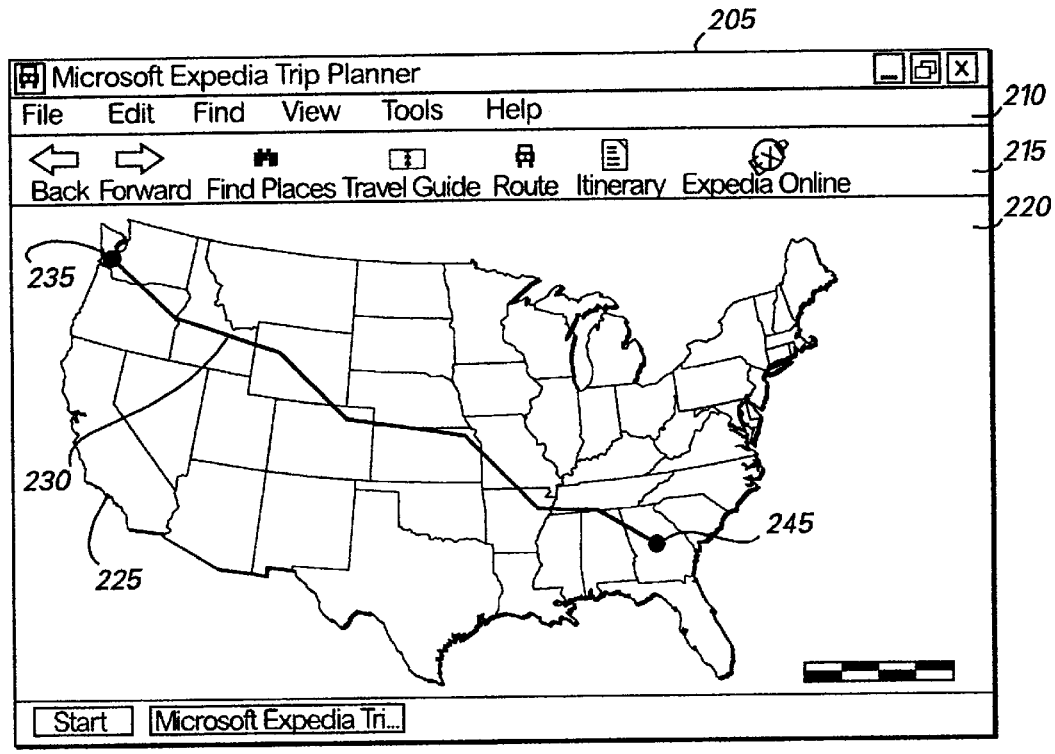
FIG. 2 is a screen image of a user interface to an exemplary map program module when displaying a map.
Figure 3:
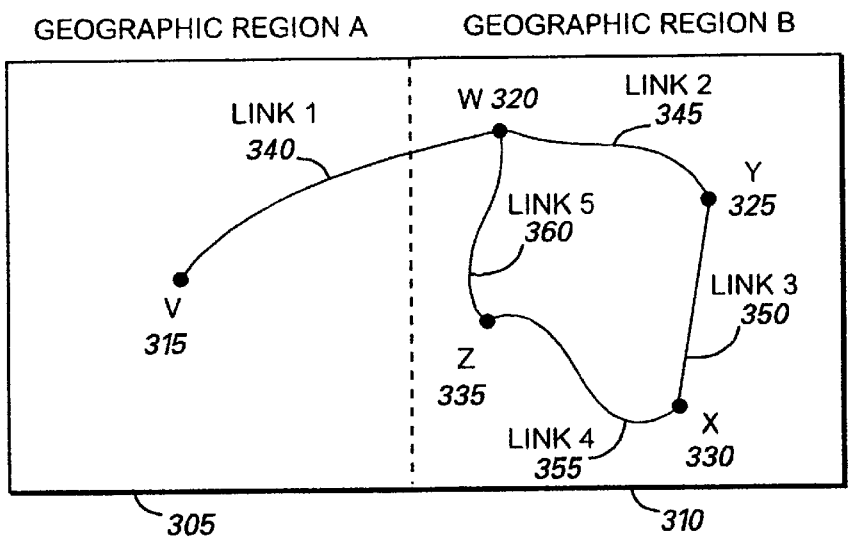
FIG. 3 is a diagram illustrating two geographic regions of a map with a link type and a node type of map elements.
Figure 4:
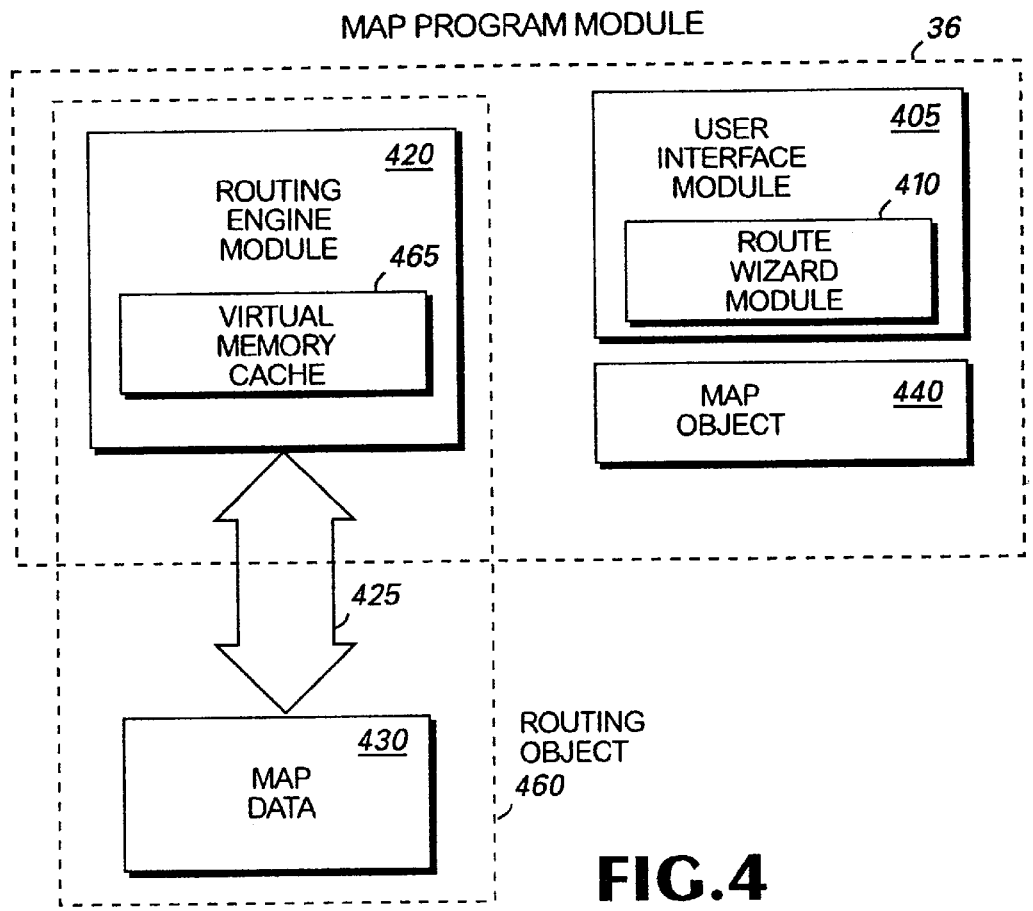
FIG. 4 is a diagram illustrating modules of a map program module in an exemplary embodiment of the present invention.
Figure 5:
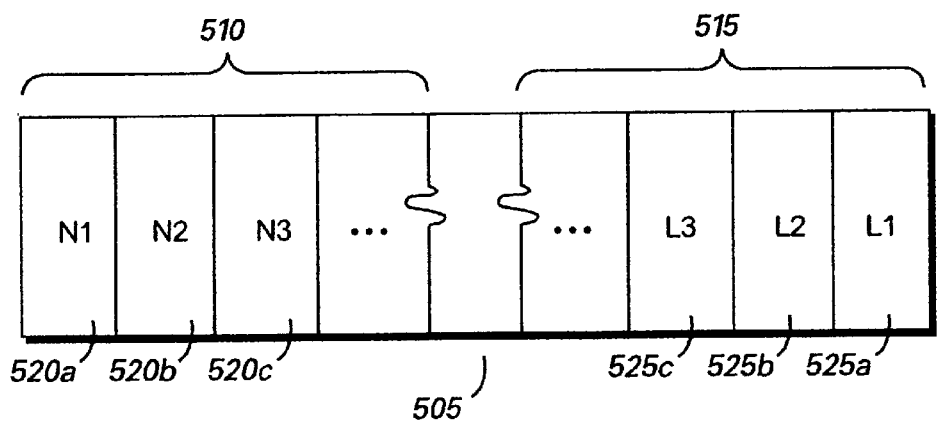
FIG. 5 is a diagram illustrating a block data structure in accordance with an exemplary embodiment of the present invention.
Figure 6:
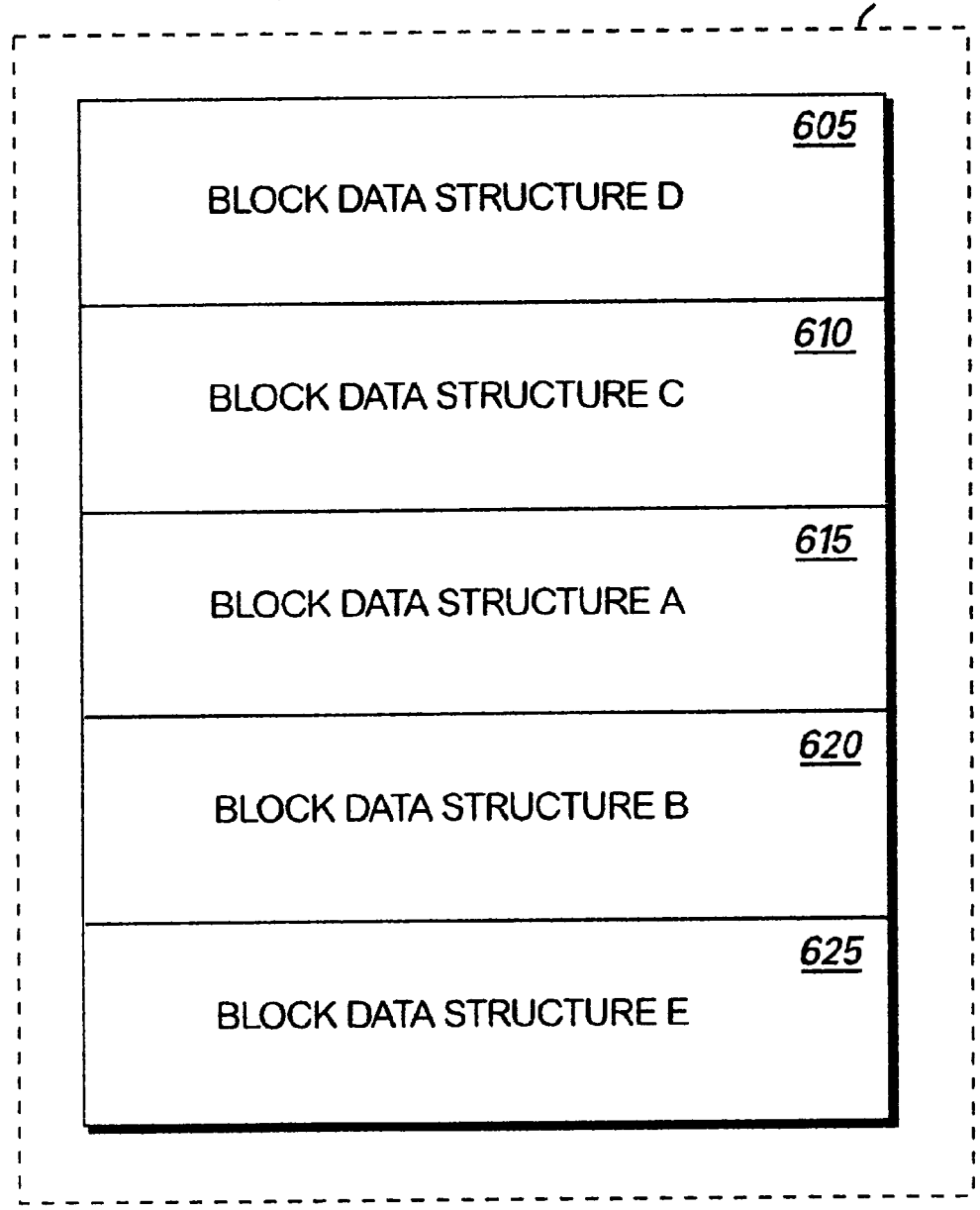
FIG. 6 is a diagram illustrating an exemplary virtual memory cache for maintaining block data structures in an exemplary embodiment of the present invention.
Figure 9:
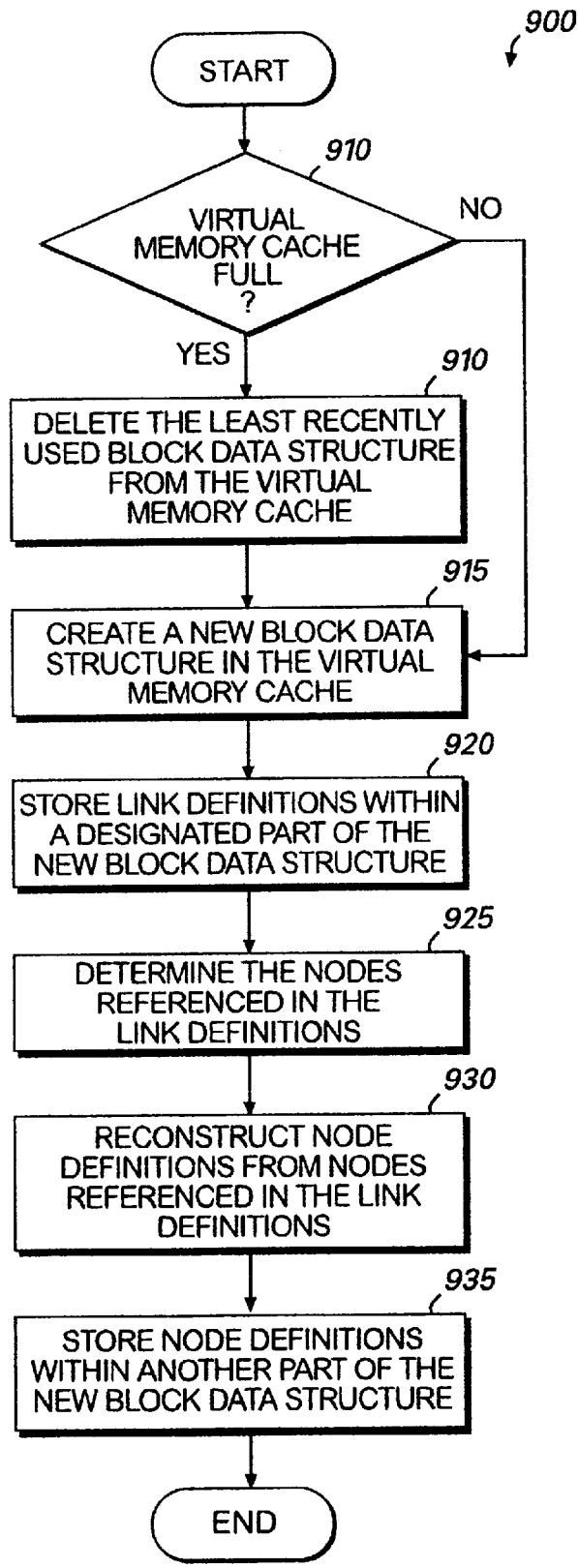
FIG. 9 is a flow diagram illustrating the preferred steps for creating a block data structure which maintains information on link types and node types of map elements in an exemplary embodiment of the present invention.

In FIG. 1, the operating environment for an embodiment of the present invention is illustrated. FIG. 2 illustrates an exemplary user interface for an exemplary map program module showing a map. FIG. 3 is a diagram illustrating how a map is divided into geographic regions having nodes and links. FIG. 4 is a diagram of software modules within the exemplary map program module. FIG. 5 is a diagram of an exemplary block data structure used to maintain information about a region's nodes and links after the information is reconstructed. FIG. 6 is a diagram of a virtual memory cache used to maintain block data structures. FIGS. 7–9 are flow diagrams describing steps for exemplary methods for accessing information about the nodes and links, for reconstructing such information, and for creating the block data structure in which to store such information.

The detailed description which follows is represented largely in terms of processes and symbolic representations of operations by a conventional computer. The processes and operations performed by the computer include the manipulation of signals by a processor and the maintenance of these signals within data structures resident in one or more media within memory storage devices. Generally, a "data structure" is an organizational scheme applied to data or an object so that specific operations can be performed upon that data or modules of data so that specific relationships are established between organized parts of the data structure. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, nodes, links, elements, entries, objects, blocks, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as receiving, determining, accessing, storing, reconstructing, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

A number of program modules may be stored in the drives and RAM 25, including an operating system 35, one or more program modules 37, such as the map program module 36, and program data 39 (such as map data 430) used by program modules.

The operating system 35, in conjunction with the BIOS 26 and associated device drivers, provides the basic interface between the computer's hardware and software resources, the user, and program modules, such as the map program module 36. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

As discussed earlier, the preferred embodiment of the present invention is embodied in a program module that works in conjunction with Microsoft Corporation's "WINDOWS 95" operating systems. However, it should be understood that the invention can be implemented for use with other operating systems, such as Microsoft Corporation's "WINDOWS NT" operating system, IBM Corporation's "OS/2" operating system, SunSoft's "SOLARIS" operating system used in workstations manufactured by Sun Microsystem, Hewlett-Packard's "HP-UX" operating system, and the operating system used in "MACINTOSH" computers manufactured by Apple Computer, Inc.

Likewise, those skilled in the art will appreciate that the map program module 36 provides a wide variety of features and functions in addition to aspects described below with respect to an embodiment of the present invention.

User Interface of the Map Program Module

The map program module 36 is used to view maps and plan trip routes between map locations. FIG. 2 is a screen image of a user interface to the map program module 36 when displaying a map. Referring now to FIG. 2, the user interface of the exemplary map program module 36 is framed with a window 205. At the top of the window 205 are several conventional drop-down menus 210 with which a user can input commands and interact with the map program module 36. Furthermore, there are a variety of icons 215 with which a user can select to interact with the map program module 36.

An exemplary map 225 is displayed within a frame 220 of the window 205. Although not shown, the map 225 can display thoroughfares, such as walking paths, roads, train tracks, sea lanes, or air corridors used for travel. A user of the map program module 36 can use the map 225 to plan a route 230 across the map 225. Typically, the user selects a starting point 235 and then selects an end point 245 for the trip. Once the starting point 235 and the end point 245 have been selected, the map program module 36 is able to determine a route between the selected points according to the user's preferences. For example, if the user prefers scenic routes, the map program module 36 determines a scenic route for the user between the selected points on the map 225. However, if the user prefers the shortest route possible, the map program module 36 determines the shortest route between the points. Typically, the determination of the route by the map program module 36 involves the calculation and use of a conventional minimum spanning tree to determine the shortest route between the selected points or map elements. Once the route is determined by the map program module 36, the determined route 230 can be displayed within the frame 220 of the window 205.

Additional information about the use of a minimum spanning tree and other solutions to shortest-span problems is available in "Algorithms in C" by Robert Sedgewick published by Addison-Wesley Publishing Company. Furthermore, an improvement on how quickly the map program module 36 determines the route when utilizing a minimum spanning tree is described in a related patent application, U.S. patent application Ser. No. 08/910,952 filed on Aug. 8, 1997 and entitled "System and Method for Calculating a Route Between Two Points," and assigned to a common assignee.

Those skilled in the art will recognize that during any process of determining a route across the map, the map program module 36 must access information about map elements defining parts of the route. A link represents a thoroughfare on the map while a node represents one of the thoroughfare's end points. One skilled in the art will therefore realize that the determined route is made up of links (thoroughfares) and connecting nodes (end points of the thoroughfares). The ability to quickly access information about a map element while the information is maintained within a compact data format is the focus of an exemplary embodiment of the present invention.

In order to quickly access information about a map element, such as a link or node, the information is typically stored in blocks of memory. As previously mentioned, the map 225 is typically divided into multiple geographic regions, each of which is associated with a block of memory. FIG. 3 is a diagram illustrating two exemplary geographic regions of a map.

Referring now to FIGS. 2–3, geographic region A 305 and geographic region B 310 are illustrated. In the exemplary embodiment, regions of the map 225 are shaped rectangularly. It is easy to define a rectangular region with a simple bounding box overlaid onto the map 225. However, the present invention is not limited to map regions of a particular shape. The present invention may work well with arbitrarily shaped regions, clusters of map elements, and with overlapping regions.

Region A 305 and region B 310 are shown having their respective map elements (e.g., their nodes and links). In general, a node type of map element represents one of the end points of a thoroughfare or path. A link type of map element represents a thoroughfare between two end points (nodes). In the exemplary embodiment, a link is defined as being bi-directional by default in that the link represents a bi-directional transportation thoroughfare. In this manner, most thoroughfares may be represented with a single link. However, a single direction or one-way link is typically represented as a link with a special bit set indicating the one-way nature of the link. As will be described further below, spanning links are defined as a special type of link with the one-way bit set.

Defining links as being bi-directional with a one-way bit to indicate otherwise may save storage space on the memory storage device when compared to storing links as all being one-way. This is because in many computerized road mapping programs, there are many more two-way thoroughfares than one-way thoroughfares.

In the simplified example illustrated in FIG. 3, there are a variety of nodes 315–335. While a region typically contains over 100 nodes and over 150 links, this simplified example is described in terms of only 5 nodes and 5 links in order to avoid confusion.

Node V 315 resides in region A 305. The rest of the nodes (nodes W 320, X 330, Y 325, and Z 335) reside within region B 310. Apart from link 1 340, all of the other links 345–360 represent two-way roads or thoroughfares. The links 340–360 between the nodes 315–335 in the illustrated example are described below in Table 1 in terms of their end points, i.e., their origination node (FROM) and their destination node (TO), as follows:

TABLE 1

| Link | FROM | TO |
| --- | --- | --- |
| Link 1 340 | Node W 320 | Node V 315 |
| Link 2 345 | Node Y 325 | Node W 320 |
| Link 3 350 | Node X 330 | Node Y 325 |
| Link 4 355 | Node X 330 | Node Z 335 |
| Link 5 360 | Node Z 335 | Node W 320 |

One skilled in the art will recognize that links 2–5 345–360 are between nodes residing within region B. However, link 1 340 is between node W 320 in region B 310 and node V 315 in region A 305. Link 1 340 is deemed to be a "spanning" link within region B 310 because it spans between nodes in different regions. This is analogous to a road spanning the distance between two intersections, each of which are on different sides of a state's border. Thus, link 1 340 is defined within region B 310 as a special type of one-way link going from node W 320 in region B 310 to node V 315 in region A 305.

A "reverse spanning link" (not shown) complementary to link 1 340 would be a one-way link from node V 315 in region A 305 to node W 320 in region B 310. Such a spanning link is deemed to be "reverse" with respect to the relevant region because it is an inbound link to the relevant region (region B 310). As an inbound or reverse spanning link, it is appropriately defined by the adjacent region (region A 305). As will be described in more detail below with regard to FIG. 5, how links and nodes are defined for a region in embodiments of the present invention takes into account such spanning links.

It is important to emphasize that the FROM and TO designations are not intended to imply a one-way nature or allowed direction of travel along the link. Although a direction is implied in the FROM and TO designations, the choice is arbitrary except in the case of a one-way link. In the case of a one-way link, the FROM and TO designations provide the allowed directional attribute.

Information about a region's map elements, such as links 1–5 340–360 and nodes W–Z 320–335 associated with region B 310, are stored within a block in a compact format. Once reconstructed from the compact format into virtual memory (an allocated part of RAM 22), the information is maintained within another block of memory called a block data structure. Block data structures are preferably fixed at 4096 bytes (4K) in size. The 4K memory size for the block data structure is preferred because manipulations of data 4K in size is standard for many assembly-level and machine-level commands. In other words, the 4K size is preferable because 4K of memory is an easy number to deal within in binary arithmetic. Additionally, the 4K memory size is preferred because it is a multiple of a common read buffer within a typical memory storage device, such as the optical disk drive 30. Furthermore, the 4K memory size is preferred because virtual memory of many operating systems 35, such as the Microsoft Corporation's "WINDOWS 95" and "WINDOWS NT 4.0" operating systems, uses 4K memory blocks. However, the selection of the 4K size for the block of memory is not a limitation for embodiments of the present invention. Other sized blocks of memory may work well or even better in other operating environments for embodiments of the present invention.

In summary, information about each map element (such as links and nodes) within a region is stored within the block of memory. Details about the block of memory associated with a region of the map 225 are further discussed below with regard to FIGS. 4–5.

Software Module Interaction

An aspect of the present invention is how information is stored and referenced within the block of memory so that it can be compactly stored yet also be quickly accessible to the routing engine. Given the above preface on maps, map regions, and map elements, how map element information is stored and accessed can be best described in terms of how modules within the exemplary map program module 36 interact. FIG. 4 is a diagram illustrating modules within the exemplary map program module 36.

Referring now to FIGS. 1–4, the map program module 36 comprises a user interface module 405, a map object 440, and a routing engine module 420. The user interface module 405 is the part of the map program module 36 responsible for creating the window 205, menus 210, and icons 215. In general, the user interface module 405 handles prompting the user for inputs and receives user inputs from the operating system 35 (via keyboard inputs and mouse messages). Within the user interface module 405 is a route wizard module 410. Essentially, the route wizard module 410 is an agent which can simplify prompting the user for inputs.

A user interacts with the user interface module 405, typically via the route wizard module 410, by selecting a starting point and an end point for a desired route. Using the route wizard module 410, the user may type in a description of the starting point and the end point. Based upon these inputs, the user interface module 405 can request the routing engine module 420 to determine a route across the map from the selected starting point to the selected end point.

In response to the request, the routing engine module 420 requests information about specific map elements when performing calculations to determine the appropriate route across the map 225. In this capacity, the routing engine module 420 needs to access information about the map elements (e.g., the links and nodes within a region of the map). In the exemplary embodiment, the routing engine module's 420 requests tend to be for map elements geographically adjacent to each other rather than completely at random.

One aspect of the present invention is how a map element is encoded or referenced so that it is easy and quick to access. In an exemplary embodiment of the present invention, a map element (such as a link or node) is encoded by a unique two-part identifying number also called an identification reference. In general, the identification reference is decoded and split into its two parts upon a request from the routing engine module 420 for information about the map element.

In the exemplary embodiment, the identification reference is a 24-bit number ideally allowing for 16 million possible map elements to be referenced within perfectly packed blocks of memory having no spanning links. The first 16 bits of the identification reference is a block ID number, more generally called a block number. This block number refers to the memory location of the block of memory associated with the referenced map element. Using the memory location instead of merely a designation for the block advantageously allows the block number to directly point to the block's location without having to look up the block's memory address within an index. Furthermore, using the block number in such a fashion eliminates the need to search for the block.

Once the routing data within the referenced block has been loaded into RAM 22 and reconstructed within a page of virtual memory, the last 8 bits of the identification reference can be used. The last 8 bits of the identification reference are an offset value, generally referred to as an offset. The offset refers to a memory location within the reconstructed block. At this memory location is the information about the referenced map element. Those skilled in the art will realize that because 8 bits translates into 256 different values, a block in the exemplary embodiment is limited to maintaining 255 map elements (e.g., links or nodes).

In summary, the encoding scheme for referencing map elements uses a two-part identification reference. This encoding scheme is advantageous because it singles out the block containing the referenced map element as well as its exact memory location within the block. Additionally, no index tables nor binary searching is required when attempting to access a map element referenced in such a clever way.

The combination of the map data 430 and the routing engine module 420 (containing methods or functions for manipulating the map data 430) is called a routing object 460 in object-oriented programming terminology. In the exemplary embodiment, the routing engine module 420 uses a conventional data path 425 to load blocks from the map data 430. Basically, once the block number of the map element is decoded, the routing engine module 420 has a "handle" or pointer to the block within the map data 430. The handles represent the cached information to the routing engine module 420. As will be discussed below in more detail, the handles are released when the cached information is no longer needed by the routing engine module 420.

A block within the map data 430 is a variable-sized block containing information about map elements within one of the map's regions and the map elements connectivity in a compact format. In this compact format, the map data 430 is also referred to as routing data. Once the routing engine module 420 loads this block, the routing engine module 420 essentially expands or reconstructs the information so that it can be more easily and quickly accessed. The reconstructed information about each map element in the relevant region is then stored in another block (RAM 22) called a block data structure. The block data structure is a fixed-sized block of RAM 22 allocated as virtual memory that is very quick to reference when compared to a variable-sized, compressed block containing the routing data within a memory storage device.

This block data structure is typically maintained within a virtual memory cache 465. Once the block data structure is in the virtual memory cache 465, the routing engine module 420 can access the information quickly without having to load the block of memory again from the map data 430. Thus, information about a map element is quickly accessed by either (1) accessing one of the block data structures within the virtual memory cache 465 or (2) by first loading the appropriate block, reconstructing the block data structure (virtual memory in RAM 22) from the block (disk storage), and then accessing the information from the new block data structure.

Although the nodes and links are accessed in a non-sequential order, there is generally a pattern by which the nodes and links are requested by the routing engine module 420. The pattern is based on the geographic layout of the map elements on the map. In other words, it is typically desirable to request access to nodes and links which lie nearby to nodes and links already in memory. This is because the routing engine module 420 typically calculates a route by connecting a series of nearby nodes and links from the route's starting point 235 to the route's end point 245. Thus, the nearby nodes and links are generally in a block data structure already loaded or in a block of memory representing a map region adjacent to the regions represented by block data structures already loaded.

Once the block data structure is no longer needed, the "handle" for the block data structure is released so that the 4K byte memory page within the virtual memory cache 465 is free to be used for another block of memory.

In summary, the routing engine module 420 can complete its determination of the route by accessing map elements via information within the block data structure. Those skilled in the art will realize that once the block data structure is created for a particular region, the routing engine module 420 may not have to create another block data structure soon because the map elements needed may be from within a single region. Thus, it is advantageous to maintain several block data structures within the virtual memory cache 465 to avoid unnecessary reloading of blocks from the map data 430. The block data structure and the virtual memory cache 465 are both described in more detail below with regard to FIGS. 5 and 6, respectively.

Block Data Structure

As previously mentioned, the block data structure is used to maintain information representing the map elements of a map region in a usable and quickly accessible form based on information in the loaded block from the map data 430. FIG. 5 is a diagram illustrating a block data structure in accordance with an exemplary embodiment of the present invention.

Referring now to FIGS. 1–5, the exemplary block data structure 505 maintains information about a node type of map element and a link type of map element in different parts of the block data structure 505. In the exemplary embodiment, a designated part 515 of the block data structure 505, preferably the end, is where information about a region's links 520a–c is stored and maintained. In the exemplary embodiment, when a new block data structure is created, the compressed block having the link information (also called routing data) is loaded from a memory storage device into the end of the new block data structure within the virtual memory cache 465.

Each link 525a–c is preferably defined with information including a FROM reference, a TO reference, a length, a class, and a special one-way bit. In the example described with regard to FIG. 3, links 1–5 340–360 would be defined in the exemplary block data structure 505 according to the information shown in Table 2 as follows:

TABLE 2

| Link | FROM Reference (8 bit Offset) | TO Reference (24 bit ID Ref) | Length | Class | One Way Bit |
|---|---|---|---|---|---|
| Link 1 340 | Node W 320 | Node V 315 | 55 | 1 | Set |
| Link 2 345 | Node Y 325 | Node W 320 | 38 | 1 | off |
| Link 3 350 | Node X 330 | Node Y 325 | 35 | 2 | off |
| Link 4 355 | Node X 330 | Node Z 335 | 40 | 3 | off |
| Link 5 360 | Node Z 335 | Node W 320 | 32 | 3 | off |

In general, the FROM and TO references describe the end points (i.e., the origination node and the destination node) for a given link. However, due to the encoding scheme used to reference a node (i.e., the identification reference), the full identification reference of the origination node need not be stored as part of the FROM reference when defining the given link. In other words, the FROM reference need only be a partial identification reference (e.g., the offset) of the origination node. This is because the block number of the origination node can be derived from the context. More particularly stated, the block number of the origination node is already known to be the block number associated with the block data structure 505. Therefore, using a partial identification reference to define the FROM reference is a form of "link compression" because it saves memory space used to define each link within a block of memory.

If there were no spanning links, additional compression and memory storage space reductions would result by defining the TO reference to be the offset of the destination node. However, to accommodate the possibility of spanning links, the TO reference is typically a full identification reference of the destination node. For example, node V 315 is the destination node for link 1 340. Without using the full identification reference of node V 315, the routing engine module 420 would inaccurately assume that node V 315 was in region B 310 instead of region A 305.

The length of each link is another piece of information typically defining each link. The length of a link is useful information when attempting to determine the shortest route. In the exemplary embodiment, the length is stored in approximately 16 bits of memory. Using 16 bits for the length is desirable in the exemplary embodiment because it is desirable to represent very long links with adequate accuracy. Very long links and adequate accuracy mean that more bits must be used to represent the length at a desired level of precision. Alternatively, the length of each link could be smaller, but more links would be required to represent a given road or thoroughfare.

Additionally, the class of each link may be important. A class is a designation characterizing the link. For example, a class designation of 1 may indicate a toll thoroughfare while a class designation of 3 may indicate a scenic thoroughfare. These class designations may be useful when the routing engine module 420 attempts to plan a route which avoids toll roads and is also scenic. In the exemplary embodiment, the class is stored in approximately 8 bits of memory.

The special one-way bit of each link designates whether the link is one-way rather than bi-directional. In the example, link 1 340 is the only link designated as a one-way link with its one-way bit being set. The rest of the links are bi-directional and, thus, may also be used to derive the list of nodes by referring to the offsets in the bi-directional link's TO Reference.

By storing the links 525*a–c* within the designated part 515 of the block data structure 505, links can be stored next to each other offset by a predetermined amount, such as the typical 10 bytes it takes to store each link. For example, a first link (L1) 525*a* is stored at the very end of the block data structure 505. The next link (L2) 525*b* is then stored a predetermined offset before L1 525*a* while being next to L1 525*a*. In this example, L2 525*b* is stored 10 bytes before L1 525*a*. A subsequent link (L3) is then stored a predetermined offset before L2 525*b* while being next to L2 525*b*. In this manner, the block data structure 505 stores its links 525*a–c* from the end back towards the beginning of the block data structure 505.

Using information about a region's links, information about the region's nodes can be reconstructed due to the encoding scheme for referencing map elements. For instance, using the example described in Table 2 and FIG. 3, node W 320 is defined by a list of link 1 340, link 2 345 and link 5 360, specifically the offset values associated with link 1 340, link 2 345 and link 5 360. The information about node W 320 would be stored within the block data structure 505 but would be derived from link information from within the map data 430. Therefore, the block in the map data 430 need not separately describe information about the region's nodes, resulting in memory storage savings.

In the exemplary embodiment, another part 510 of the block data structure 505, preferably the beginning, is where information about a region's nodes 520*a–c* are stored and maintained for quick access. A given node is defined with information including a list of links associated with the node. Each of the listed links may be identified by their identification reference. However, due to the encoding scheme the listed links are preferably identified using only a partial identification reference (e.g., the 8-bit offset). Listing the links using only the partial identification reference also saves memory space used to define each node.

Performance reasons, such as generating the smallest memory storage space for the map data 430, can place a limitation on how many links may be used to define a node. Experimentation on the optimum ratio of node to links will depend on the operating environment of the present invention. In the exemplary embodiment, nodes are defined with a "5 valence" limit meaning that a node can only be defined with at most 5 links. Intersections with more than 5 roads, more generally called thoroughfares, are likely to be uncommon. Such intersections or end points are preferably represented as a compound map element of two nodes (each with less than 5 links) and a virtual link connecting the two nodes. As a result, one skilled in the art will recognize that the combination of the two nodes and the virtual link appropriately represents the intersection while staying within the valence limit.

By storing the nodes 520*a–c* at the other part 510 of the block data structure 505, nodes can be stored next to each other offset by a predefined amount, such as the typical 5 bytes it takes to store each node. For example, a first node (N1) 520*a* is stored at the beginning of the block data structure 505. The next node (N2) 520*b* is then stored a predetermined offset after N1 520*a* while being next to N1 520*a*. A subsequent node (N3) is then stored a predetermined offset after N2 520*b* while being next to N2 520*b*. In this manner, the block data structure 505 stores its nodes 520*a–c* from the beginning towards the end of the block data structure 505.

By storing map elements, such as nodes 520*a–c* and links 520*a–c*, in the above-described manner, each block data structure 505 is filled from each end. Thus, the map program module 36 can use an identification reference to (1) determine if block referenced by the block number has been loaded in memory and reconstructed as a block data structure and (2) access information about a map element within the block data structure 505.

Virtual Memory Cache for Block Data Structures

Once a block of memory referenced by a block number has been loaded in memory and reconstructed as a block data structure 505, the block data structure is typically stored within the virtual memory cache 465. In this manner, the routing data or compressed information about a map element is decompressed into an allocated part of RAM 22 (a block data structure within the virtual memory cache 465). FIG. 6 is a diagram illustrating a virtual memory cache in accordance with an exemplary embodiment of the present invention.

Referring now to FIGS. 1, 4, 5, and 6, the map program module 420 maintains the block data structure 505 within the virtual memory cache 465. Basically, the virtual memory cache 465 is a list of block data structures 605–625 accessed by the map program module 36. As map elements from different blocks within the map data 430 are accessed by the routing engine module 420, the virtual memory cache 465 begins to fill up with corresponding different block data structures 605–625. Thus, the virtual memory cache 465 operates as a virtual memory window into the information stored in the map data 430.

In the exemplary embodiment, the block data structures 605–625 are ordered within the virtual memory cache 465 according to how recently the block data structures have been used. The ordering of how recently the block data structures have been used is typically implemented with a conventional lookup table or buffer within RAM 22. For example, the lookup table may indicate that block data structure A 615 is the most recently used while block data structure E 605 is the least recently used within the virtual memory cache 465. In this manner, the block data structures 605–625 need not be physically maintained within the virtual memory cache 465 in a specific order or shuffled about based upon their use.

When the virtual memory cache 465 is full and a new block data structure 505 is created in response to a request for information about a map element, the least recently used block data structure is deleted from within the virtual memory cache 465. For example, if block data structure E 625 is the least recently used of the block data structures 605–625 and a new block data structure 505 is created from a loaded block of memory, the new block data structure 505 would replace block data structure E 625 in the virtual memory cache 465.

The size of the virtual memory cache 465 depends upon the size of the block data structures and the amount of free memory. In the exemplary embodiment, the virtual memory cache 465 can typically hold approximately 100 block data structures within an allocated 512K of RAM 22. At such a size, using 4096 byte block data structures with 255 or less map elements per block data structure, the hit ratio is maintained at a desirable level (typically greater than 90%) when the routing engine module 420 is determining a route 230 across the map 225. Thus, the routing engine module 420 has to seek a block of memory from the map data 430 on a memory storage device only when the block is not represented by one of the block data structures 605–625 within the virtual memory cache 465.

Those skilled in the art will be familiar with the concept of caching data to provide rapid access to the data. Furthermore, those skilled in the art will recognize that the present invention is not limited to a software implementation of the virtual memory cache 465. A dedicated hardware cache memory device connected to the processor 21 may be used as a virtual memory cache 465 with embodiments of the present invention in addition to a virtual memory in RAM 22. Furthermore, the block data structures representing the entire map 225 may be loaded given a larger amount of allocated virtual memory to further increase the hit ratio.

Flow Diagrams

FIGS. 7–9 are flow diagrams illustrating various aspects of the present invention. FIG. 7 is a flow diagram illustrating an exemplary method for accessing map element information using the specially encoded identification reference for the map element. FIG. 8 is a flow diagram illustrating an exemplary method for reconstructing map element information. Finally, FIG. 9 is a flow diagram illustrating an exemplary method for creating a block data structure when accessing map element information according to an embodiment of the present invention.

Referring now to FIGS. 1, 4 and 7, the method 700 begins at step 705 where a request for a map element is received. An identification reference is received in the request for a map element. The received identification reference includes a block ID number (block number) and an offset. At step 710, the block number associated with the map element is determined from the identification reference.

In the exemplary embodiment, this determination is accomplished by masking the appropriate bits of the identification reference to pull out the 16-bit block number. The masked number is the beginning address for the block associated with the map element. One skilled in the art will appreciate that using an encoding scheme to directly determine which block is associated with the map element avoids time-consuming binary searching processes or use of a look-up or index table.

At step 725, if the block referenced by the block number has already been loaded in RAM 22 from a storage device containing the map data 430, then step 715 proceeds directly to step 725. This is the situation when the block is already represented by a block data structure in the virtual memory cache 465. However, if the block referenced by the block number has not been loaded in memory, step 715 proceeds to step 720.

At step 720, the block of memory referenced by the block number is loaded from the map data 430 on a memory storage device, such as the CD 31. Within this block is information about the desired map element also called routing data. In the exemplary embodiment, the information in the block is used to create another block of memory in the virtual memory cache 465, namely a block data structure.

At step 725, the offset of the map element is determined from the value of the offset in the map element's identification reference. This offset points to the memory location within the block data structure for the map element.

In the exemplary embodiment, the determination of the offset is accomplished by masking the appropriate bits of the identification reference to pull out the 8-bit offset. The offset is then multiplied by an appropriate size factor, depending on whether the map element is a link or a node, in a simple and fast binary operation. The multiplied value is the memory location of the map element relative to the beginning of the block data structure for a node or relative to the end of the block data structure for a link.

At step 730, the information about the map element is accessed using the memory location indicated by the identification reference's offset. In the exemplary embodiment, if the map element is a node, information about the node is accessed using the offset relative to the beginning of the block data structure. However, if the map element is a link, information about the link is accessed using the offset relative to the end of the block data structure. In summary, the identification reference provides a clever encoding scheme for quickly and directly accessing information about a map element.

Another inventive aspect involves how, at step 720, information describing all of a region's map elements is reconstructed from the information stored in a loaded block (the routing data). FIG. 8 is a flow diagram illustrating an exemplary method for loading such a block with the routing data from memory storage and reconstructing information about the map elements (e.g., links and nodes) from this routing data.

Referring now to FIGS. 1, 4, 7, and 8, the method 800 begins at step 805 where the routing engine module 420 seeks a block of physical memory (i.e., the block having the map data 430) on a computer-readable medium, such as the CD 31. The block of physical memory is referenced by a block ID (identification) number. The block is read and loaded from the medium at step 810.

At step 815, information about a region's links is read from the loaded block. More particularly stated, the definitions of each link are read from the loaded block. As previously discussed with regard to FIG. 5, the links are typically defined with a FROM reference for an origination node, a TO reference for a destination node, a length, a class, and a one-way bit for the link.

At step 820, the routing engine module 420 now has information (link definitions) that refers to specific nodes within the region. Using this information (link definitions) the routing engine module 420 is able to reconstruct the node definitions. More specifically stated, the node definitions are reconstructed from the nodes referenced in the link definitions. Each node in the region is defined by each of the links referencing that particular node. In the exemplary embodiment, the node definitions are reconstructed based upon each of the two-way links referencing the node and any outbound one-way links. These links are the links referencing the particular node in a link's FROM reference and TO reference.

Referring back to the example of FIG. 3 and Table 2, the nodes of region B 310 are typically reconstructed from each of the different nodes described as FROM references (Node W 320, Node Y 325, Node X 330, and Node Z 335) of the region's link definitions. Additionally, the nodes are typically reconstructed from each of the nodes described as TO references of the region's two-way links (Node W 320, Node Y 325, Node X 330, and Node Z 335). For example, node W 320 is referenced as the FROM reference of Link 1 340. Node V 315 is not referenced as either one of the FROM references or as one of the TO references for a two-way link. Therefore, node V 315 is not determined to be one of region B's 310 nodes.

In summary, the link definitions are read from the loaded block. From this information, the node definitions are reconstructed. Reconstructing the node definitions avoids the requirement of storing additional information in the map data 430 about the nodes, thus providing an advantageous savings in memory usage when representing map information.

Once the node definitions are reconstructed, the information about the region's elements is stored in a quickly accessible form, i.e., a block data structure, such as one of the block data structures 605–625 within the virtual memory cache 465. FIG. 9 is a detailed flow diagram illustrating the preferred steps for creating a block data structure which maintains information on link types and node types of map elements.

Referring now to FIGS. 3, 4, 7, 8, and 9, the method 900 begins at step 905 where a determination is made on whether the virtual memory cache 465 is full. If the virtual memory cache 465 is full, step 905 proceeds to step 910. In the exemplary embodiment, a conventional lookup table is maintained for tracking (1) which of the blocks of memory representing regions of the map 225 are resident within the virtual memory cache 465 and (2) how often the blocks have been accessed by the routing engine module 420.

At step 910, the least recently used of the block data structures 605–625 is located within the virtual memory cache 465 to be a new block data structure before proceeding to step 920. In the exemplary embodiment, the information within the least recently used block data structure will be simply overwritten to become the new block data structure. However, if the virtual memory cache 465 is not yet full, step 905 proceeds directly to step 920 where the new block data structure is created from an unused page of virtual memory within the virtual memory cache 465.

At step 920, the information defining each link within the map region is stored within a designated part, such as within the end part 515, of the new block data structure. Information about each link is typically stored within the designated part of the new block data structure in 10 bytes of memory.

At step 925, the information defining each link is used to determine the nodes referenced. In the exemplary embodiment, this information is typically the links referring to nodes in their FROM reference (including any outbound spanning links) and the two-way links referring to nodes in their TO reference.

At step 930, the definitions for each node in the map region are reconstructed from the nodes referenced in the link definitions, preferably the nodes referenced in the FROM reference part of the link definitions and the nodes referenced in the TO reference part of only the two-way links. In the exemplary embodiment, these definitions are partial identification references (e.g., the 8-bit offset) for each link related to the particular node.

At step 935, the definitions of each node in the map region are then stored within another part of the new block data structure, such as the beginning part 510. Once the definitions of the links and nodes are fully reconstructed and stored within the new block data structure, the block data structure is used to provide access to information about individual map elements in the map region. In summary, the virtual memory cache 465 maintains a desired number of block data structures 605–625 so that the routing engine module 420 can quickly access map element information using the specially encoded identification reference while the information is compactly maintained in the map data 430.

Conclusion

From the foregoing description, it will be appreciated that embodiments of the present invention provides a system and method for accessing information about a map element (such as a link or a node). An encoded identification reference is used to identify one of the map elements needed by the routing engine module 420. A block number is determined and an offset value is determined from the map element's identification reference. The block number provides a memory address to the beginning of a block within the map data 430. The offset value is a memory location relative to the block's memory address. If the block referenced by the block number has not yet been loaded from the map data 430, the block having information about a map region's map elements is loaded from the memory storage device, such as the optical disk drive 30. Once loaded, the information about each link type of map element is read. This link information is stored within a designated part of a block data structure. Additionally, the link information is used to reconstruct information about the map region's node type of map elements. Once reconstructed, the node information is stored within another part of the block data structure. The block data structure remains in RAM 22 in a virtual memory cache 465 so that the routing engine module 420 can quickly access information about a map element while information about the map element is compactly stored on disk in the map data 430.

The foregoing system and method may be conveniently implemented in one or more program modules based upon the flow diagrams in FIGS. 7–9 and their related descriptions. No particular programming language is required for carrying out the various procedures described above because it is considered that the operations, functions, methods, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. For example, principles of the present invention may also be applied to a segment of a computer network (a type of data thoroughfare) in the context of planning a route for information across a large computer network, such as the global Internet. Furthermore, those skilled in the art will understand that the principles of the present invention are not limited to any particular type of memory storage device.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system comprising a display device, a processing unit, a user input device, and a memory comprising a plurality of blocks of memory, each block of memory comprising a plurality of memory locations, the display device operable for displaying a computerized road map comprising a plurality of map elements, a method for retrieving information stored in at least one block of memory associated with at least one map element, comprising the steps of:

selecting at least one map element in the electronic map using the user input device, wherein each map element is selected from the group consisting essentially from a thoroughfare on the computerized roadmap or an endpoint connected to the thoroughfare on the computerized roadmap;

retrieving an identification reference associated with the map element in response to selecting the map element, the identification reference comprising;

a block number associated with at least one block of memory location containing the information associated with the map element, and an offset value defining at least one memory location within a memory that contains the information associated with the map element;

retrieving the block of memory defined by the block number;

reconstructing the block of memory in a virtual memory; and retrieving the information associated with the map element from the block of memory location defined by the offset value.

2. The method of claim 1, wherein the computerized road map is divided into a plurality of geographic regions and each geographic region is associated with at least one block of memory.

3. The method of claim 1, wherein the step of reconstructing the block of memory comprises the steps of:

retrieving the plurality of information from the block of memory;

expanding the plurality of information; and storing the expanded plurality of information in a block data structure in a virtual memory.

4. The method of claim 3, wherein the map element represents a thoroughfare on the computerized road map.

5. A computer-readable medium having computer-executable instructions for executing the steps of claim 1.

6. An apparatus operable for performing the steps of claim 1.

7. A computer-readable medium containing computer executable instructions for accessing information about a plurality of link elements related to a region of a computerized road map, a plurality of node elements related to the region of the computerized road map, comprising the steps of:

retrieving a first block of memory from a storage device associated with the region of the computerized road map;

reconstructing the first block of memory in a virtual memory;

retrieving information associated with at least one link element from the reconstructed first block of memory, the information comprising;

a partial identification reference associated with first node element in the computerized road map, the partial identification reference comprising a first offset value defining a memory location within the reconstructed first block of memory that contains information associated the first node element, and a full identification reference associated with a second node element in the computerized road map, the identification reference comprising a block number associated with second block of memory associated with the second node element and a second offset value defining a memory location within the second block of memory that contains information associated the second node element;

reconstructing information about each of the node elements from the information about the link elements; and loading the reconstructed information into a new block data structure.

8. The computer-readable medium of claim 7, wherein each of the plurality of link elements represents a thoroughfare within the region of the map.

9. The computer-readable medium of claim 7, wherein the first node element and the second node element each represent an endpoint of a thoroughfare within the region of the map.

10. The computer-readable medium of claim 7, wherein the full identification reference comprises:

a block number that defines at least one memory location storing the information associated with the map element, and an offset value defining at least one memory location within the virtual memory that contains the information associated with the map element.

11. The computer-readable medium of claim 10, wherein the block number provides a memory storage location of the block of memory.

12. The computer-readable medium of claim 7, wherein the reconstructing step further comprises;

retrieving the link information associated with each node element;

expanding the link information associated with each node element; and storing the expanded information in a block data structure in the virtual memory.

13. A method for creating a block data structure comprising a plurality of link elements and a plurality of node elements associated with a computerized road map, the link element comprising a plurality of link information and the plurality of node elements comprising a plurality of node information, comprising the steps of:

retrieving the plurality of link information associated with each link element from a memory device;

storing the plurality of link information within a first part of the block data structure for each link element;

for each link element performing a sequence comprising the steps of;

determining every node element associated with the link element;

retrieving the plurality of node information associated with each node element associated with the link element from the memory device;

reconstructing the plurality of node information associated with each node element associated with each link element; and storing the reconstructed information associated with each node elements within a second part of the block data structure.

14. The method of claim 13, wherein the first part of the block data structure includes the end of the block data structure.

15. The method of claim 14, wherein the second part of the block data structure includes the beginning of the block data structure.

16. The method of claim 13, wherein the information related to each of the link elements comprises a TO reference associated with the second node element and a FROM reference associated with the first node element.

17. The method of claim 16, wherein the information related to the first node element and the second node element comprise a list of the link elements related to the first and second the node elements.

18. The method of claim 17, wherein the list includes the link elements having the FROM reference associated with the first and second the node elements.

19. The method of claim 17, wherein the list further includes those of the link elements being two-way and having the TO reference associated with the first and second the node elements.

20. A system for accessing information about a plurality of map elements associated with a region of a computerized road map, wherein each map element is associated with an identification reference, comprising:

a processor;

a cache of memory coupled to the processor, the cache of memory for maintaining a block data structure;

a storage device coupled to the processor, the storage device for maintaining a block of memory; and the processor being operative to:

receive a user input signal selecting at least one of the plurality of map elements;

retrieve the identification reference associated with the selected map element, the identification reference comprising a block number representing a memory storage location of the block of memory within the storage device and an offset value representing a memory location within the block data structure of information about the one of the map elements;

load the block of memory from the storage device having information about the map elements related to the region into a virtual memory, create the block data structure in the cache of memory, store information related to a link type of the map elements in a first part of the block data structure, reconstruct information related to a node type of the map elements and store the reconstructed information in a second part of the block data structure, and access the information about the map elements within the block data structure.

* * * * *